US008238753B2

(12) United States Patent
Hamano et al.

(10) Patent No.: US 8,238,753 B2
(45) Date of Patent: Aug. 7, 2012

(54) OPTICAL LINE TERMINAL

(75) Inventors: Hiroshi Hamano, Kawasaki (JP);
Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 12/414,074

(22) Filed: Mar. 30, 2009

(65) Prior Publication Data

US 2009/0190931 A1 Jul. 30, 2009

Related U.S. Application Data

(63) Continuation of application No. PCT/JP2006/324008, filed on Nov. 30, 2006.

(51) Int. Cl.
*H04J 14/08* (2006.01)
(52) U.S. Cl. ........................................................ 398/100
(58) Field of Classification Search ............ 398/99–100, 398/202
See application file for complete search history.

(56) References Cited

U.S. PATENT DOCUMENTS

| 7,174,106 B2* | 2/2007 | Weber ............................ 398/135 |
| 7,738,163 B2* | 6/2010 | Bidmead et al. ............... 359/334 |
| 2008/0050116 A1 | 2/2008 | Nakaishi et al. | |

FOREIGN PATENT DOCUMENTS

| JP | 6-216880 | 8/1994 |
| JP | 7-115432 | 5/1995 |
| JP | 8-8954 | 1/1996 |
| JP | 10-262074 | 9/1998 |
| JP | 2000-151533 | 5/2000 |
| JP | 2005-33537 | 2/2005 |
| JP | 2006-81014 | 3/2006 |
| JP | 2007-274280 | 10/2007 |
| JP | 2007-300376 | 11/2007 |
| JP | 2008-54244 | 3/2008 |

OTHER PUBLICATIONS

International Preliminary Report on Patentability, mailed Dec. 3, 2009 in corresponding International Patent Application PCT/JP2006/324008.
Japanese Office Action issued Feb. 8, 2011 in corresponding Japanese Patent Application 2008-548106.
International Search Report and Written Opinion mailed Feb. 27, 2007 in corresponding International Application No. PCT/JP2006/324008 (9 pp.).
Tanaka, K., *Backward Compatibility*, 10Gb/s PHY for EPON SG, IEEE802.3 interim meeting, Austin, May 24-25, 2006, KDDI R&D Laboratories, Inc. http://grouper.ieee.org/groups/802/3/10GEPON_study/public/may06/tanaka_1_0506.pdf (7 pp.).

* cited by examiner

*Primary Examiner* — Shi K Li
(74) *Attorney, Agent, or Firm* — Staas & Halsey LLP

(57) ABSTRACT

An optical line terminal receives an optical signal transmitted by time division multiple access from plural optical network units among which are an optical network unit performing communications at a first bit rate and an optical network unit performing communications at a second bit rate. The optical line terminal includes a branching unit, a first receiving unit, and a second receiving unit. The branching unit branches the optical signal into branches, at an asymmetrical branching ratio. The first receiving unit receives a branch having the first bit rate, among the branches of a greater branched proportion. The second receiving unit receives a branch having the second bit rate, among the branches of a lesser branched proportion.

7 Claims, 12 Drawing Sheets

OPTICAL LINE TERMINAL

This application is a continuation of International Application No. PCT/JP2006/324008, filed Nov. 30, 2006, the disclosure of which is incorporated herein in its entirety by reference.

FIELD

The embodiments discussed herein are related to an optical line terminal in a communication system that includes a mixture of communication systems of different communication speeds.

BACKGROUND

In recent years, the introduction of optical subscriber (access) systems primarily as communication systems with a 1 Gbps-class transmission capacity for a passive double-star cable plant capable of accommodating multiple subscribers, such as Gigabit Ethernet (registered trademark)-Passive Optical Network (GE-PON) and G-PON, has progressed.

As a next-generation communication system, communication systems with a transmission capacity of 10 Gbps have been under consideration, and active efforts have been made toward standardization of the same. In addition, discussions have been held concerning migration to a 10-Gbps communication system newly mixed with an existing 1-Gbps communication system (refer to Japanese Laid-Open Patent Application Publication No. H8-8954; and Tanaka, Keiji, "Backward Compatibility", 10 Gb/s PHY for EPON Study Group IEEE 802.3 Interim Meeting Austin, Tex., Presentation Materials, [online], May 24 to 25, 2006, KDDI R&D Laboratories Inc. [searched on Nov. 29, 2006], Internet <URL:http://grouper.ieee.org/groups/802/3/10GEPON_ study/pub lic/may06/tanaka_1_0506.pdf, for example).

FIG. 9 is a diagram for explaining a configuration example of a communication system without a mixed 1-Gbps and 10-Gbps communication systems environment. As depicted in FIG. 9, in a first configuration example, the 1-Gbps communication system and the 10-Gbps communication system are configured independently. A 1-Gbps optical line terminal (OLT) is connected only to 1-Gbps subscriber optical network units (ONUs). A 10-Gbps optical line terminal is connected only to 10-Gbps optical network units.

FIG. 10 is a diagram for explaining a first configuration example of a communication system having a mixed 1-Gbps and 10-Gbps communication systems environment. As depicted in FIG. 10, in the first configuration example, the 1-Gbps communication system and the 10-Gbps communication system are mixed through wavelength division multiplexing (WDM).

FIG. 11 is a diagram for explaining a second configuration example of a communication system having a mixed 1-Gbps and 10-Gbps communication systems environment. As depicted in FIG. 11, in the second communication example, the 1-Gbps communication system and the 10-Gbps communication system are mixed through time division multiple access (TDMA).

FIG. 12 is a diagram for explaining a third configuration example (downlinks) of a communication system having a mixed 1-Gbps and 10-Gbps communication systems environment. As depicted in FIG. 12, in the third configuration example, the 1-Gbps communication system and the 10-Gbps communication system are mixed through WDM for downlinks from OLTs 1242 and 1245 to optical network units 1211 and 1212.

Optical signals from the 1-Gbps optical line terminal 1242 and 10-Gbps optical line terminal 1245 are transferred through WDM via a branching unit 1241 and a transmission line 1230, and are transmitted by a branching unit 1220 to the 1-Gbps optical network unit 1211 and the 10-Gbps optical network unit 1212. Among the optical signals output from the branching unit 1220, the optical network unit 1211 and the optical network unit 1212 receive only signals of optical wavelengths allocated thereto, respectively, according to system speed.

FIG. 13 is a diagram for explaining the third configuration example (uplinks) of a communication system having a mixed 1-Gbps and 10-Gbps communication systems environment. As depicted in FIG. 13, in the third configuration example, the 1-Gbps communication system and the 10-Gbps communication system are mixed through TDMA for uplinks from the OLTs 1211 and 1212 to the optical network units 1242 and 1245.

The optical network units 1211 and 1212 transmit optical signals within respective time frames allocated thereto. Optical signals from the optical network unit 1211 and the optical network unit 1212 are transferred through TDMA via the branching unit 1220 and the transmission line 1230, and are transmitted by the branching unit 1241 to the OLTs 1242 and 1245. Among the optical signals output from the branching unit 1241, the optical line terminal 1242 and 1245 receive only signals within the time frames allocated thereto, respectively, according to system speed.

However, the conventional technique depicted in FIGS. 12 and 13 cause optical coupler branch loss at the branching unit 1241 (>3 dB) in both the 1-Gbps communication system and the 10-Gbps communication system, which leads to a problem in that the existing loss budget cannot be maintained for the 1-Gbps communication system or the 10-Gbps communication system.

Particularly in the 1-Gbps communication system, apparatuses that are currently being introduced have no loss budget margin, and when migration to the 10-Gbps communication system takes place, the apparatuses cannot be operated due to optical coupler branching loss. Thus, a problem further arises in that the system requires fundamental restructuring such as increasing optical output from a cable plant, reducing the capacity for accommodation of subscribers in the 1-Gbps communication system, etc.

SUMMARY

According to an aspect of an embodiment, an optical line terminal receives an optical signal transmitted by time division multiple access from plural optical network units among which are an optical network unit performing communications at a first bit rate and an optical network unit performing communications at a second bit rate. The optical line terminal includes a branching unit, a first receiving unit, and a second receiving unit. The branching unit branches the optical signal into branches, at an asymmetrical branching ratio. The first receiving unit receives a branch having the first bit rate, among the branches of a greater branched proportion. The second receiving unit receives a branch having the second bit rate, among the branches of a lesser branched proportion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to the accompanying drawings.

Figure 1:
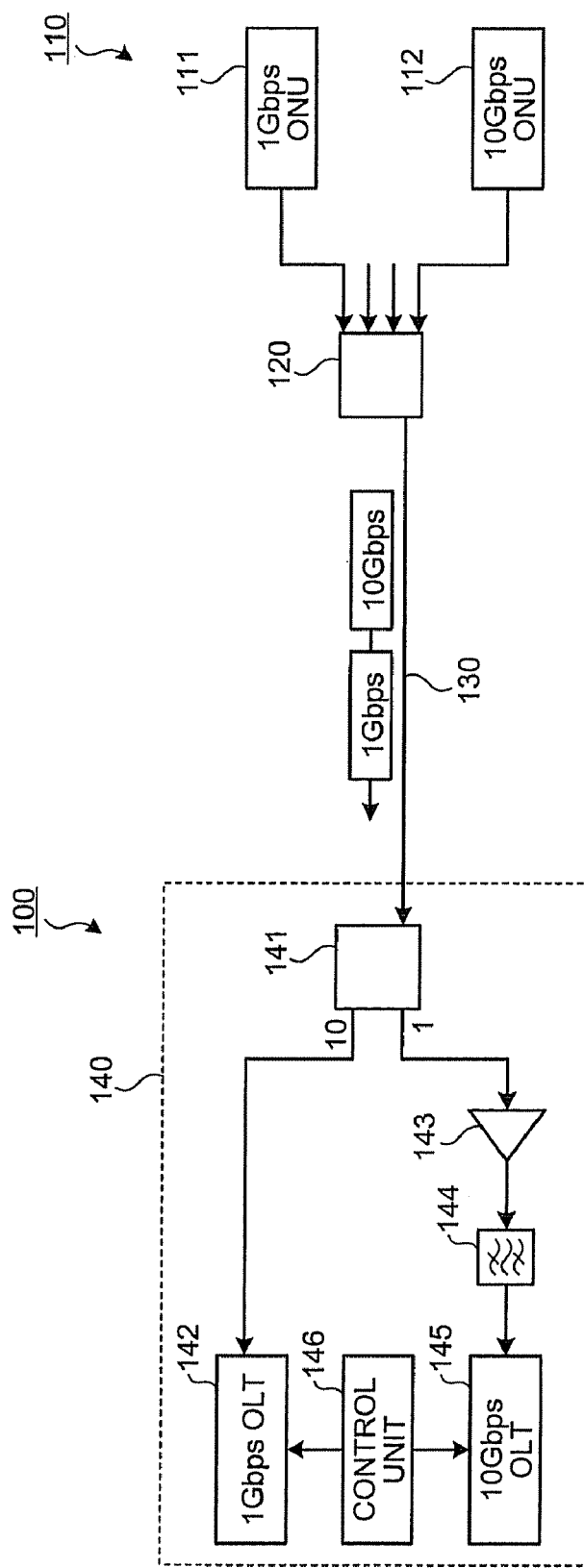
FIG. 1 is a block diagram for explaining a basic configuration of a communication system in which an optical line terminal according to a first embodiment is employed.

FIG. 1 is a block diagram for explaining a basic configuration of a communication system in which an optical line terminal according to a first embodiment is employed. As depicted in FIG. 1, a communication system 100 is a PON that includes plural optical network units 110, a branching unit 120, a transmission line 130, and an optical line terminal 140.

The communication system 100 has a mixture of communication systems of different bit rates. With regard to this arrangement, migration of a 10-Gbps communication system to an existing 1-Gbps communication system will be explained. In the communication system 100, communication systems of different bit rates are mixed through TDMA for an uplink from the optical network unit 110 to the optical line terminal 140.

The optical network units 110 include a low-speed optical network unit (1-Gbps ONU) 111 that conducts communications at a low bit rate (a predetermined bit rate) and a high-speed optical network unit (10-Gbps ONU) 112 that conducts communications at a high bit rate (a bit rate different from the predetermined bit rate). The predetermined bit rate here refers to 1 Gbps, and the bit rate different from the predetermined bit rate here refers to 10 Gbps.

The optical network units 110 transmit optical signals within respective time frames allocated thereto, based on information concerning TDMA transmission received from the optical line terminal 140. The branching unit 120 transmits the optical signals from the optical network units 110 to the optical line terminal 140 via the transmission line 130.

The optical line terminal 140 includes a branching unit 141, a low-speed communicating unit (1-Gbps OLT) 142, an amplifying unit 143, a filtering unit 144, a high-speed communicating unit (10-Gbps OLT) 145, and a control unit 146. The branching unit 141 branches the optical signals transmitted from the optical network units 110 via the branching unit 120 and the transmission line 130, at an asymmetrical branching ratio (intensity ratio).

For example, the branching unit 141 branches an optical signal at a branching ratio of 1:10. Among the branched optical signals, the branching unit 141 outputs an optical signal of a greater branched proportion to the low-speed communicating unit 142, and outputs an optical signal of a lesser branched proportion to the high-speed communicating unit 145. The branching ratio may range from about 1:5 to 1:15, for example, to maintain the intensity of the optical signal output to the low-speed communicating unit 142.

Among the optical signals of a greater branched proportion output from the branching unit 141, the low-speed communicating unit 142 receives optical signals of a lower bit rate (1 Gbps here). The amplifying unit 143 amplifies, as appropriate, optical signals in a lesser branched proportion output from the branching unit 141. The amplifying unit 143 outputs the amplified optical signals to the filtering unit 144. The amplifying unit 143 here is constituted by a semiconductor optical amplifier (SOA).

The filtering unit 144 removes amplified spontaneous emission (ASE) noise from the optical signals output from the amplifying unit 143. The filtering unit 144 then outputs the optical signals from which ASE noise has been removed, to the high-speed communicating unit 145. The high-speed communicating unit 145 receives, among the optical signals of a greater branched proportion output from the filtering unit 144, optical signals of a higher bit rate (10 Gbps here).

The control unit 146 has a function of dynamic bandwidth allocation (DBA) for controlling TDMA in a PON, and allocates time frames for signal transmission to all the optical network units connected to the network. The control unit 146 controls the low-speed communicating unit 142 and the high-speed communicating unit 145 so as to receive optical signals transmitted through time division multiple access from the optical network units 110, according to the corresponding speeds of the optical signals.

Figure 2:
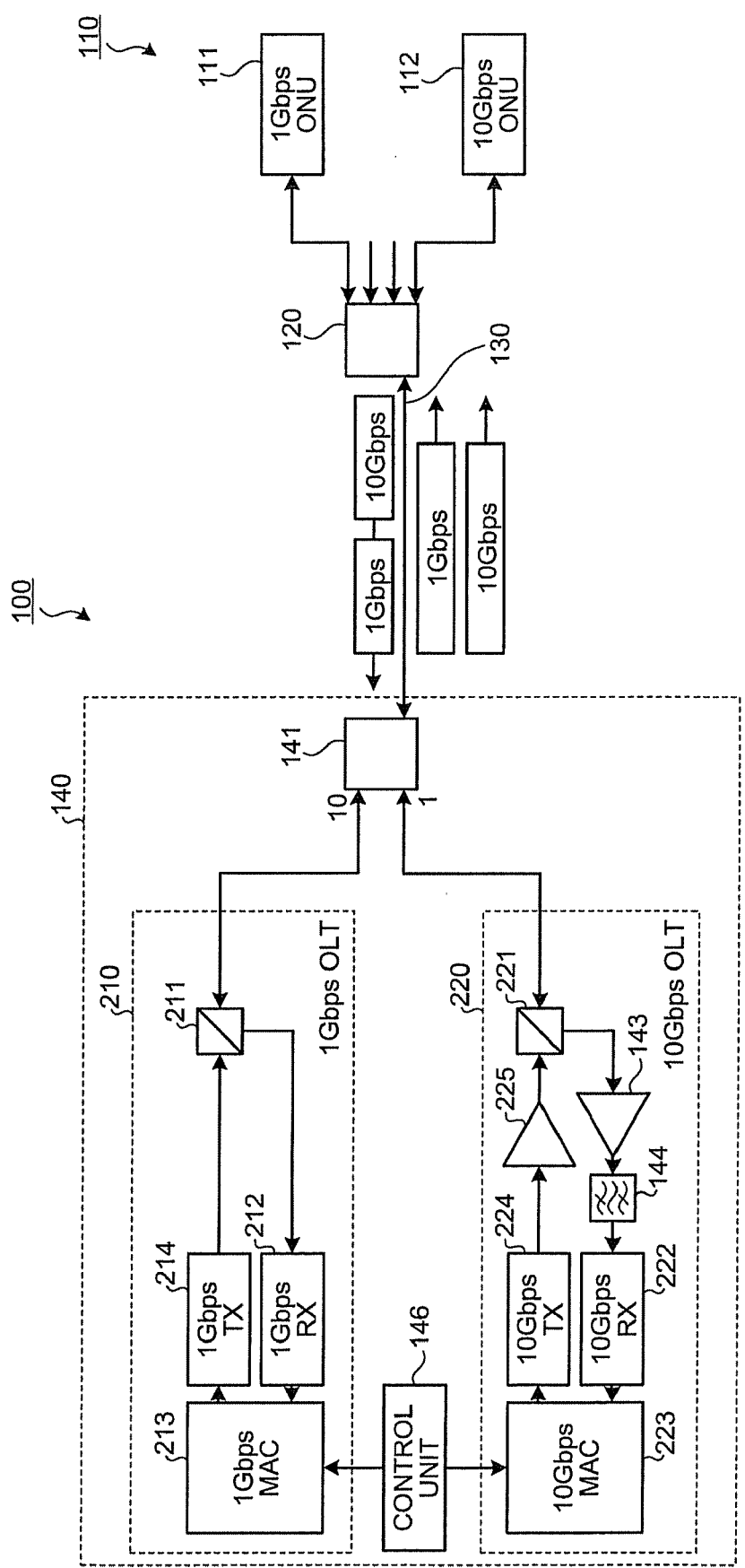
FIG. 2 is a block diagram for explaining a specific configuration of a communication system in which the optical line terminal according to the first embodiment is employed.

FIG. 2 is a block diagram for explaining a specific configuration of a communication system in which the optical line terminal according to the first embodiment is employed. In FIG. 2, constituent elements identical to those in the communication system 100 depicted in FIG. 1 are given the same reference numerals as those in the communication system 100 depicted in FIG. 1, and explanation thereof will be omitted. As depicted in FIG. 2, the optical line terminal 140 includes the branching unit 141, a low-speed communicating unit 210, a high-speed communicating unit 220, and the control unit 146. The low-speed communicating unit 210 includes a multiplexing and demultiplexing unit 211, a low-speed receiver 212, a low-speed data processing unit 213, and a low-speed transmitter 214.

The multiplexing and demultiplexing unit 211 outputs an optical signal from the branching unit 141 (uplink) to the low-speed receiver 212. The multiplexing and demultiplexing unit 211 further outputs an optical signal from the low-speed transmitter 214 (downlink) to the branching unit 141. Since the optical signal output from the low-speed transmitter 214 and the optical signal output from the branching unit 141 are different in wavelength, the multiplexing and demultiplexing unit 211 switches between paths for the optical signals through filtering according to wavelength.

The low-speed receiver 212 receives an optical signal output from the multiplexing and demultiplexing unit 211, and converts the received optical signal into an electrical signal. The low-speed receiver 212 outputs the converted electrical signal to the low-speed data processing unit 213. The low-speed data processing unit (1-Gbps media access control (MAC)) 213 demodulates the electrical signal output from the low-speed receiver 212 into a received data signal, and subjects the signal to data processing such as error correction.

The low-speed data processing unit 213, under the control of the control unit 146, also modulates a transmitted data signal into a 1-Gbps electrical signal and outputs the modulated electrical signal to the low-speed transmitter 214. The low-speed transmitter 214 converts the electrical signal output from the low-speed data processing unit 213 into an optical signal, and transmits the optical signal to the multiplexing and demultiplexing unit 211.

The high-speed communicating unit 220 includes a multiplexing and demultiplexing unit 221, the amplifying unit 143, the filtering unit 144, a high-speed receiver 222, a high-speed data processing unit 223, a high-speed transmitter 224, and an amplifying unit 225. The multiplexing and demultiplexing unit 221 outputs an optical signal from the branching unit 141 to the high-speed receiver 222 via the amplifying unit 143 and the filtering unit 144. The multiplexing and demultiplexing unit 221 further outputs an optical signal from the amplifying unit 225 to the branching unit 141.

The high-speed receiver 222 receives an optical signal output from the multiplexing and demultiplexing unit 221 via the amplifying unit 143 and the filtering unit 144, and converts the received optical signal into an electrical signal. The high-speed receiver 222 outputs the converted electrical signal to the high-speed data processing unit 223. The high-speed data processing unit (10-Gbps MAC) 223 demodulates the electrical signal output from the high-speed receiver 222 into a received data signal, and subjects the signal to data processing such as error correction.

The high-speed data processing unit 223 also modulates a transmitted data signal into a 10-Gbps electrical signal under control of the control unit 146, and outputs the modulated electrical signal to the high-speed transmitter 224. The high-speed transmitter 224 converts the electrical signal output from the high-speed data processing unit 223 into an optical signal, and transmits the optical signal to the amplifying unit 225. The high-speed transmitter 224 transmits an optical signal different in wavelength from the optical signal transmitted from the low-speed transmitter 214.

The amplifying unit 225 amplifies, as appropriate, an optical signal transmitted from the high-speed transmitter 224, and outputs the optical signal to the multiplexing and demultiplexing unit 221. The control unit 146 controls the low-speed data processing unit 213 and the high-speed data processing unit 223 so as to receive an optical signal transmitted through time division multiple access. The control unit 146 also controls the low-speed data processing unit 213 and the high-speed data processing unit 223 so as to output transmitted data.

Figure 3:
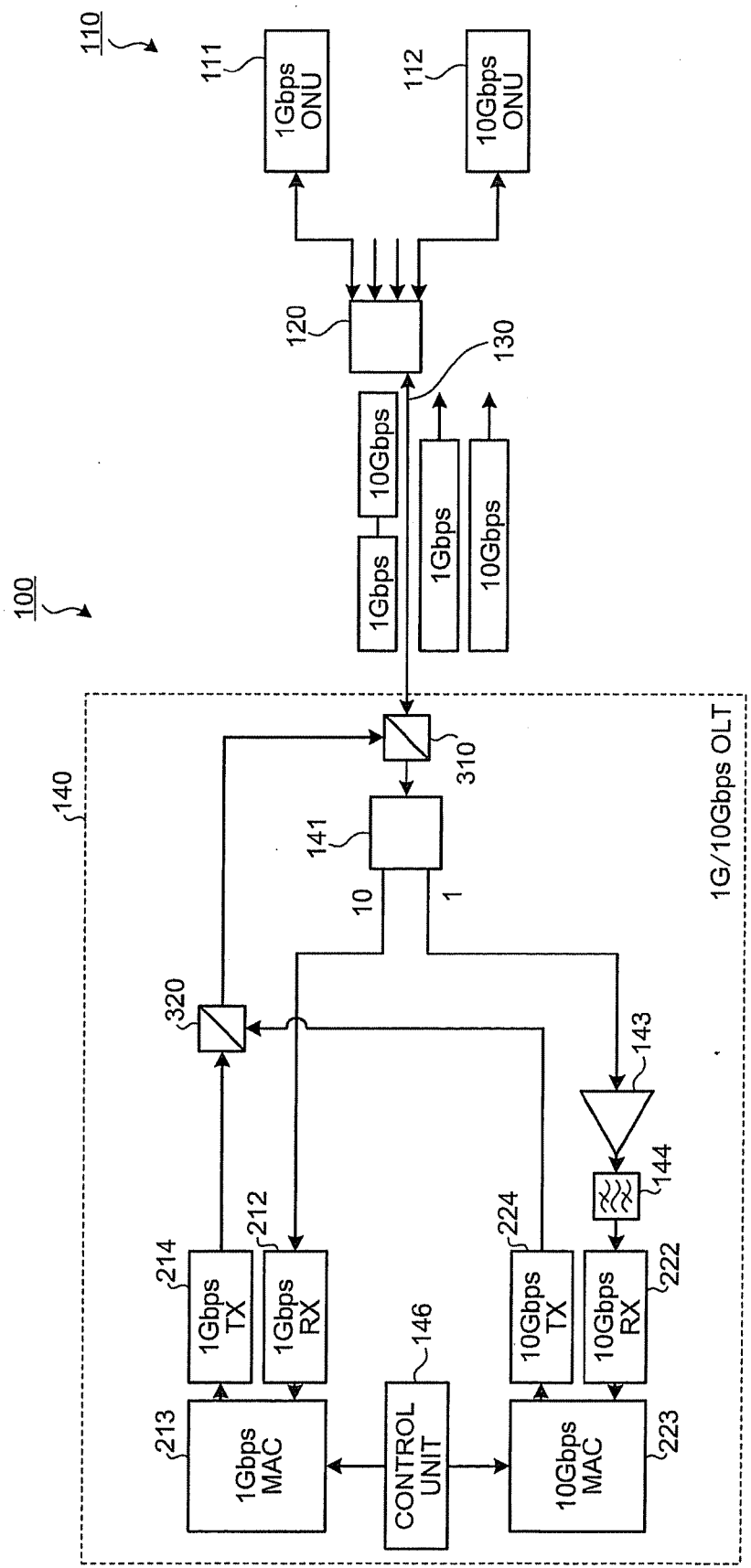
FIG. 3 is a block diagram for explaining another specific configuration of a communication system in which the optical line terminal according to the first embodiment is employed.

FIG. 3 is a block diagram for explaining another specific configuration of a communication system in which the optical line terminal according to the first embodiment is employed. In FIG. 3, constituent elements identical to those in the communication system 100 depicted in FIG. 1 or 2 are given the same reference numerals as those in the communication system 100 depicted in FIG. 1 or 2, and explanation thereof will be omitted. As depicted in FIG. 3, the optical line terminal 140 includes a multiplexing and demultiplexing unit 310, the branching unit 141, the low-speed receiver 212, the low-speed data processing unit 213, the low-speed transmitter 214, the amplifying unit 143, the filtering unit 144, the high-speed receiver 222, the high-speed data processing unit 223, the high-speed transmitter 224, a multiplexing and demultiplexing unit 320, and the control unit 146.

The multiplexing and demultiplexing unit 310 outputs to the branching unit 141, optical signals transmitted from the optical network units 110 via the branching unit 120 and the transmission line 130. The multiplexing and demultiplexing unit 310 further transmits an optical signal output from the multiplexing and demultiplexing unit 320, to the optical network units 110 via the transmission line 130 and the branching unit 120.

The branching unit 141 branches an optical signal output from the multiplexing and demultiplexing unit 310. Among the branched optical signals, the branching unit 141 outputs an optical signal of a greater branched proportion to the low-speed receiver 212. In addition, among the branched optical signals, the branching unit 141 outputs an optical signal of a lesser branched proportion to the high-speed receiver 222 via the amplifying unit 143 and the filtering unit 144.

The low-speed transmitter 214 converts an electrical signal output from the low-speed data processing unit 213 into an optical signal, and outputs the optical signal to the multiplexing and demultiplexing unit 320. The high-speed transmitter 224 converts an electrical signal output from the high-speed data processing unit 223, into an optical signal, and outputs the optical signal to the multiplexing and demultiplexing unit 320. The multiplexing and demultiplexing unit 320 performs wavelength multiplexing on optical signals output from the low-speed data processing unit 213 and from the high-speed transmitter 224. The multiplexing and demultiplexing unit 320 outputs the wavelength-multiplexed optical signal to the multiplexing and demultiplexing unit 310.

As described above, according to the optical line terminal 140 of the first embodiment, the branching unit 141 branches an optical signal at an asymmetrical branching ratio such that an optical signal of a greater branched proportion is branched and transmitted from the branching unit 141 to the low-speed receiver 212, thereby restraining intensity loss in the low-speed communication system. Accordingly, even if a high-speed communication system is migrated to a cable plant of an existing low-speed communication system, it is possible to maintain the loss budget for the low-speed communication system.

In addition, the amplifying unit 143 amplifies an optical signal branched from the branching unit 141 to the high-speed receiver 222, thereby maintaining the intensity of the optical signal branched to the high-speed receiver 222. Further, the filtering unit 144 transmits the optical signal amplified by the amplifying unit 143, thereby removing ASE noise generated at the amplifying unit 143. This makes it possible to maintain the signal noise ratio (SNR) of the optical signal branched from the branching unit 141 to the high-speed receiver 222.

Figure 4:
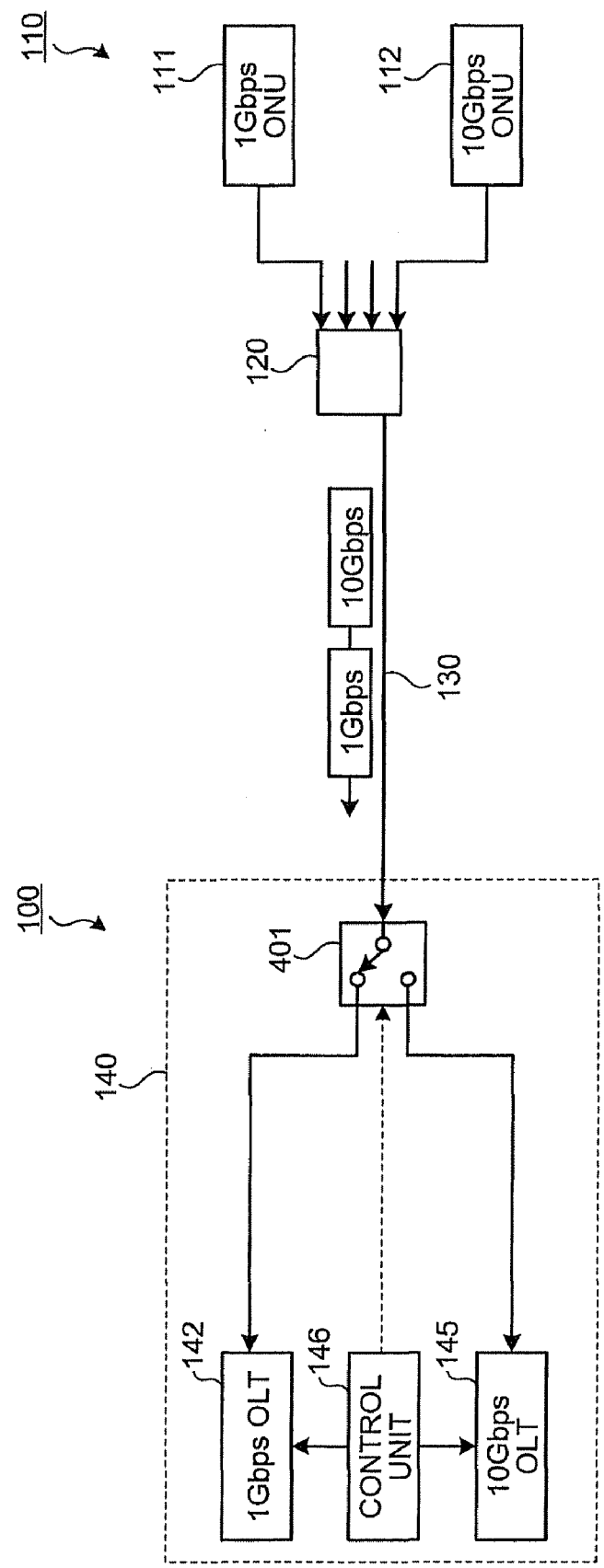
FIG. 4 is a block diagram for explaining a basic configuration of a communication system in which an optical line terminal according to a second embodiment is employed.

FIG. 4 is a block diagram for explaining a basic configuration of a communication system in which an optical line terminal according to a second embodiment is employed. In FIG. 4, constituent elements identical to those in the communication system 100 depicted in FIG. 1 are given the same reference numerals as those in the communication system 100 depicted in FIG. 1, and explanation thereof will be omitted. As depicted in FIG. 4, the optical line terminal 140 in the second embodiment includes an optical switch 401 in place of the branching unit 141 of the optical line terminal 140 according to the first embodiment.

The optical switch 401 outputs optical signals transmitted from the optical network units 110 via the branching unit 120 and the transmission line 130, to either the high-speed communicating unit 145 or the low-speed communicating unit 142, under control of the control unit 146. The control unit 146 controls the optical switch 401 so as to output a 1-Gbps optical signal to the low-speed communicating unit 142 and to output a 10-Gpbs optical signal to the high-speed communicating unit 145, based on time division multiple access information.

Figure 5:
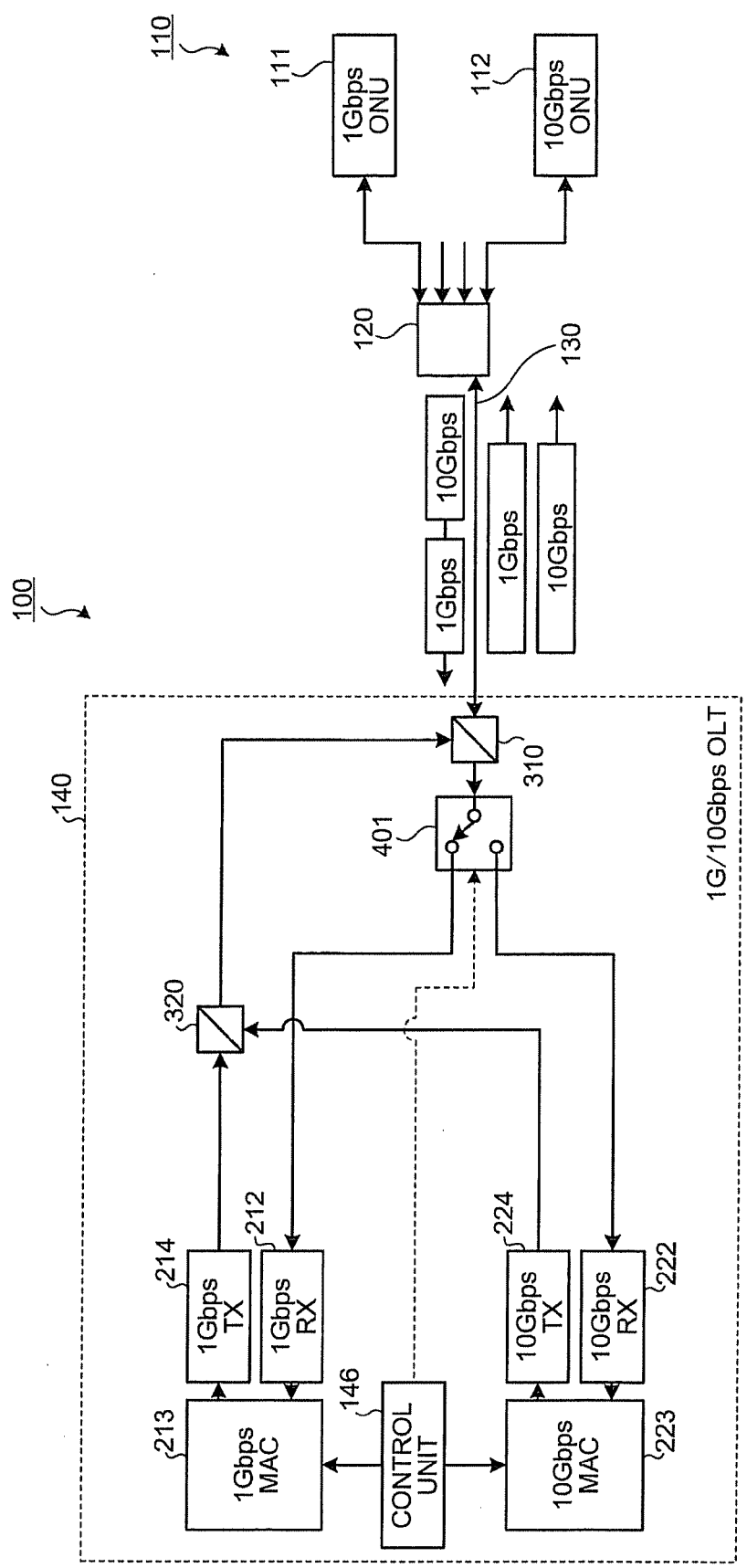
FIG. 5 is a block diagram for explaining a specific configuration of a communication system in which the optical line terminal according to the second embodiment is employed.

FIG. 5 is a block diagram for explaining a specific configuration of a communication system in which the optical line terminal according to the second embodiment is employed. In FIG. 5, constitutional elements identical to those in the communication system 100 depicted in FIGS. 3 and 4 are given the same reference numerals as those in the communication system 100 depicted in FIGS. 3 and 4, and explanation thereof will be omitted. As depicted in FIG. 5, the optical line terminal 140 includes the optical switch 401 in place of the branching unit 141 of the optical line terminal 140 depicted in FIG. 3.

The multiplexing and demultiplexing unit 310 outputs optical signals transmitted from the optical network units 110 via the branching unit 120 and the transmission line 130, to the optical switch 401. The optical switch 401 outputs optical signals transmitted from the optical network units 110 via the branching unit 120 and the transmission line 130, to either the low-speed receiver 212 or the high-speed receiver 222, under control of the control unit 146.

The control unit 146 controls the optical switch 401 so as to output a 1-Gbps optical signal to the low-speed receiver 212 and to output a 10-Gbps optical signal to the high-speed receiver 222, based on time division multiple access information.

As described above, according to the optical line terminal 140 of the second embodiment, the optical switch 401 outputs a 1-Gbps optical signal to the low-speed receiver 212 and outputs a 10-Gbps optical signal to the high-speed receiver 222, thereby restraining intensity loss in the low-speed communication system. Accordingly, even if a high-speed communication system is migrated to a cable plant of an existing low-speed communication system, it is possible to maintain the loss budget for the low-speed communication system.

Figure 6:
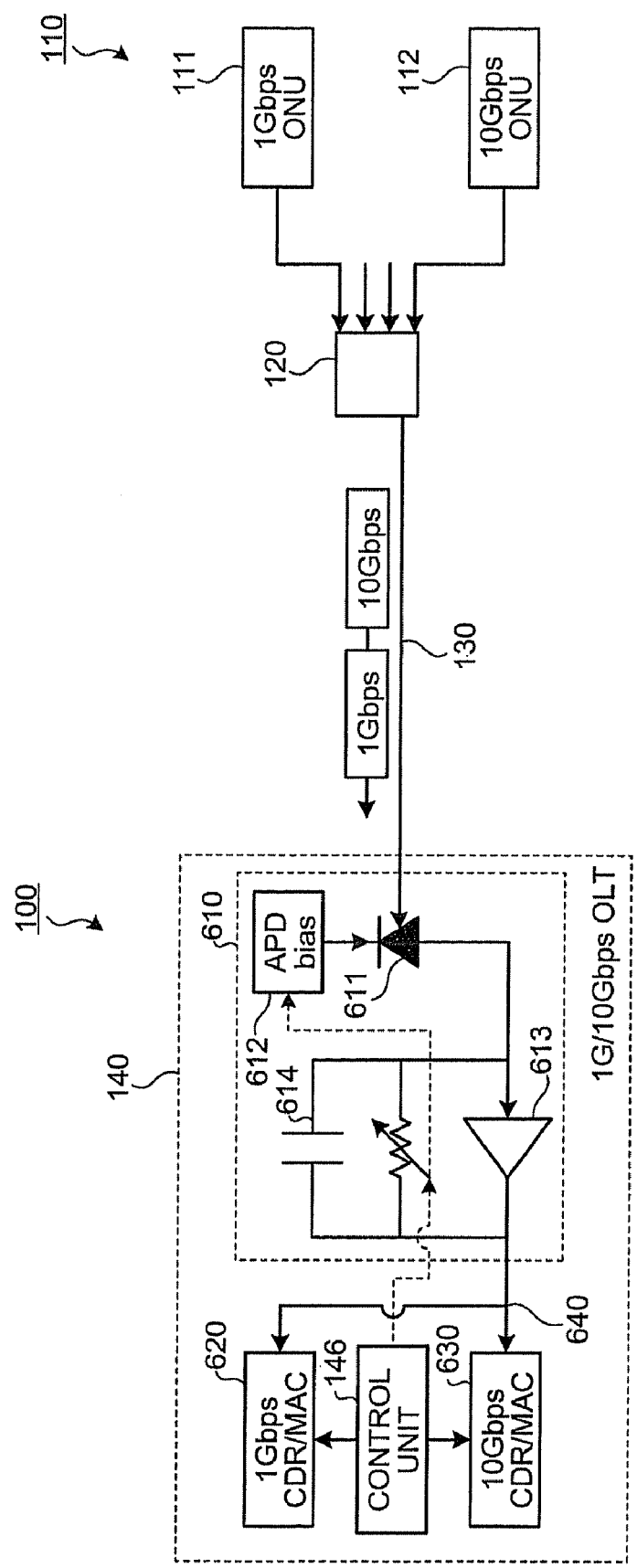
FIG. 6 is a block diagram for explaining a basic configuration of a communication system in which an optical line terminal according a third embodiment is employed.

FIG. 6 is a block diagram for explaining a basic configuration of a communication system in which an optical line terminal according a third embodiment is employed. In FIG. 6, constituent elements identical to those in the communication system 100 depicted in FIGS. 1 and 2 are given the same reference numerals as those in the communication system 100 depicted in FIGS. 1 and 2, and explanation thereof will be omitted. As depicted in FIG. 6, the optical line terminal 140 according to the third embodiment includes an optoelectric converting unit 610, a low-speed communicating unit 620, a high-speed communicating unit 630, and the control unit 146.

The optoelectric converting unit 610 converts into electrical signals, optical signals transmitted from the optical network units 110 via the branching unit 120 and the transmission line 130. The optoelectric converting unit 610 outputs the converted electrical signals to the low-speed communicating unit 620 and the high-speed communicating unit 630, respectively. The branching unit 640 branches the electrical signals output from the optoelectric converting unit 610, and outputs the branched electrical signals to the low-speed communicating unit 620 and the high-speed communicating unit 630, respectively. The branching unit 640 is not a specific device but a wiring connection.

Specifically, the optoelectric converting unit 610 includes an avalanche photo diode (APD) 611, an APD bias unit 612, a trans-impedance amplifier (TIA) 613, and an auto-gain control unit (AGC) 614.

The APD 611 converts into electrical signals, optical signals transmitted from the optical network units 110 via the branching unit 120 and the transmission line 130. The APD 611 outputs the converted electrical signals to the TIA 613. The APD bias unit 612 applies a bias voltage to the APD 611. The APD bias unit 612 controls the value of the bias voltage applied to the APD 611 under control of the control unit 146, thereby changing gain or bandwidth in the APD 611.

The TIA 613 amplifies the electrical signal output from the APD 611. The TIA 613 outputs the amplified electrical signal to the low-speed communicating unit 620 and the high-speed communicating unit 630, respectively. The AGC 614 automatically controls gain or bandwidth in the TIA 613. The AGC 614 also changes at least one of gain and bandwidth in the TIA 613 under control of the control unit 146. The control unit 146 controls at least one of gain and bandwidth in the optoelectric converting unit 610, based on time division multiple access information.

Specifically, the control unit 146 controls at least one of the AGC 614 and the APD bias unit 612, such that, when the optical line terminal 140 receives a 1-Gbps optical signal, gain in the optoelectric converting unit 610 becomes larger than gain in the case of receiving a 10-Gbps optical signal. The control unit 146 further controls at least one of the AGC 614 and the APD bias unit 612, such that, when the optical line terminal 140 receives a 10-Gbps optical signal, gain in the optoelectric converting unit 610 becomes smaller than gain in the case of receiving a 1-Gbps optical signal.

The control unit 146 further controls at least one of the AGC 614 and the APD bias unit 612, such that, when the optical line terminal 140 receives a 1-Gbps optical signal, a bandwidth in the optoelectric converting unit 610 becomes narrower than a bandwidth in the case of receiving a 10-Gbps optical signal. The control unit 146 controls at least one of the AGC 614 and the APD bias unit 612, such that, when the optical line terminal 140 receives a 10-Gbps optical signal, a bandwidth in the optoelectric converting unit 610 becomes wider than a bandwidth in the case of receiving a 1-Gbps optical signal.

Figure 7:
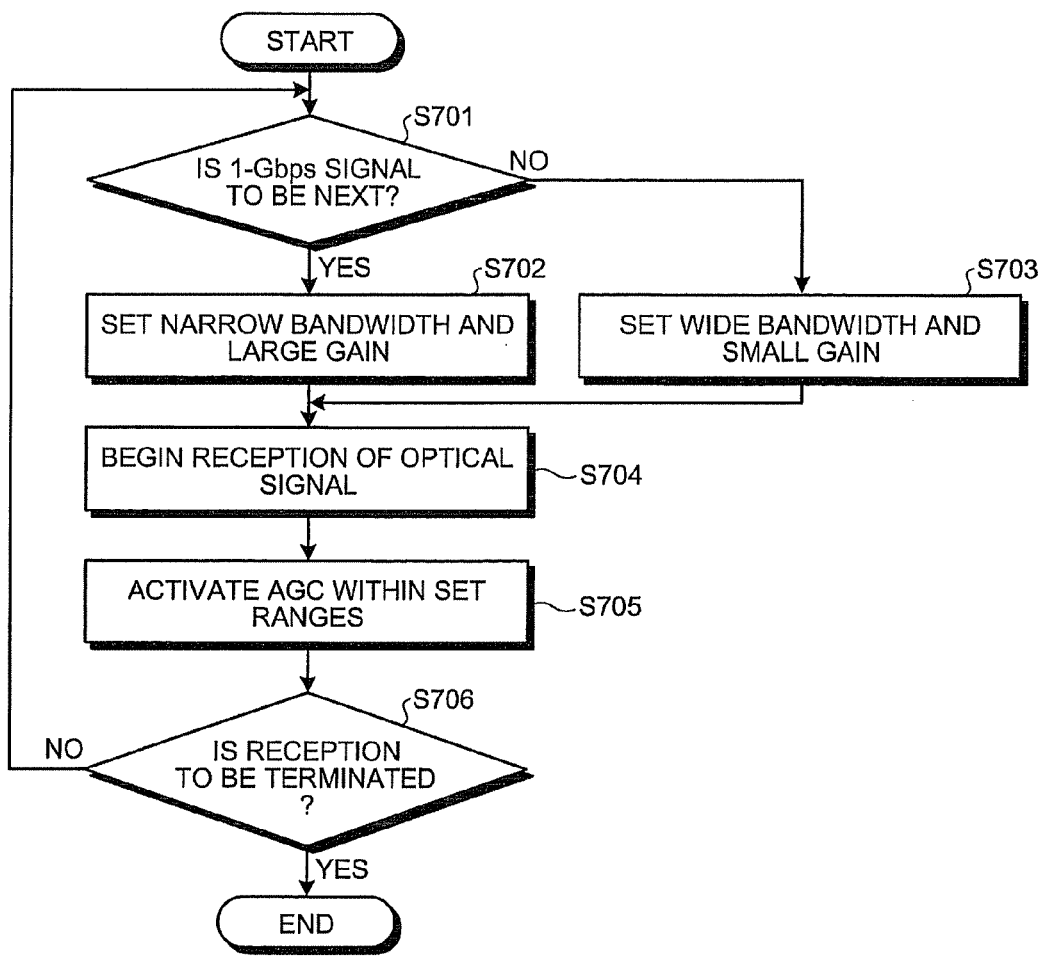
FIG. 7 is a flowchart for explaining operation of the optical line terminal according to the third embodiment.

FIG. 7 is a flowchart for explaining operation of the optical line terminal according to the third embodiment. As depicted in FIG. 7, the control unit 146 determines whether an optical signal to be received next is a 1-Gbps optical signal, based on time division multiple access information (step S701). If the optical signal to be received next is a 1-Gbps optical signal (step S701: YES), the control unit 146 sets a narrow bandwidth and a large gain in the optoelectric converting unit 610 (step S702), and the process proceeds to step S704.

If the control unit 146 determines at step S701 that the optical signal to be received next is a 10-Gbps optical signal (step S701: NO), the control unit 146 sets a wide bandwidth and a small gain in the optoelectric converting unit 610 (step S703), and the process proceeds to step S704. The control unit 146 begins reception of the optical signal (step S704), and activates the AGC 614 within the ranges of values set at steps S702 or S703 (step S705).

Next, the control unit 146 determines whether reception of the optical signal is to be terminated (step S706). If the control unit 146 determines that reception of the optical signal is not to be terminated (step S706: NO), the control unit 146 returns to step S701, and the process continues. If the control unit 146 determines at step S706 that reception of the optical signal is to be terminated (step S706: YES), a series of the process ends.

Figure 8:
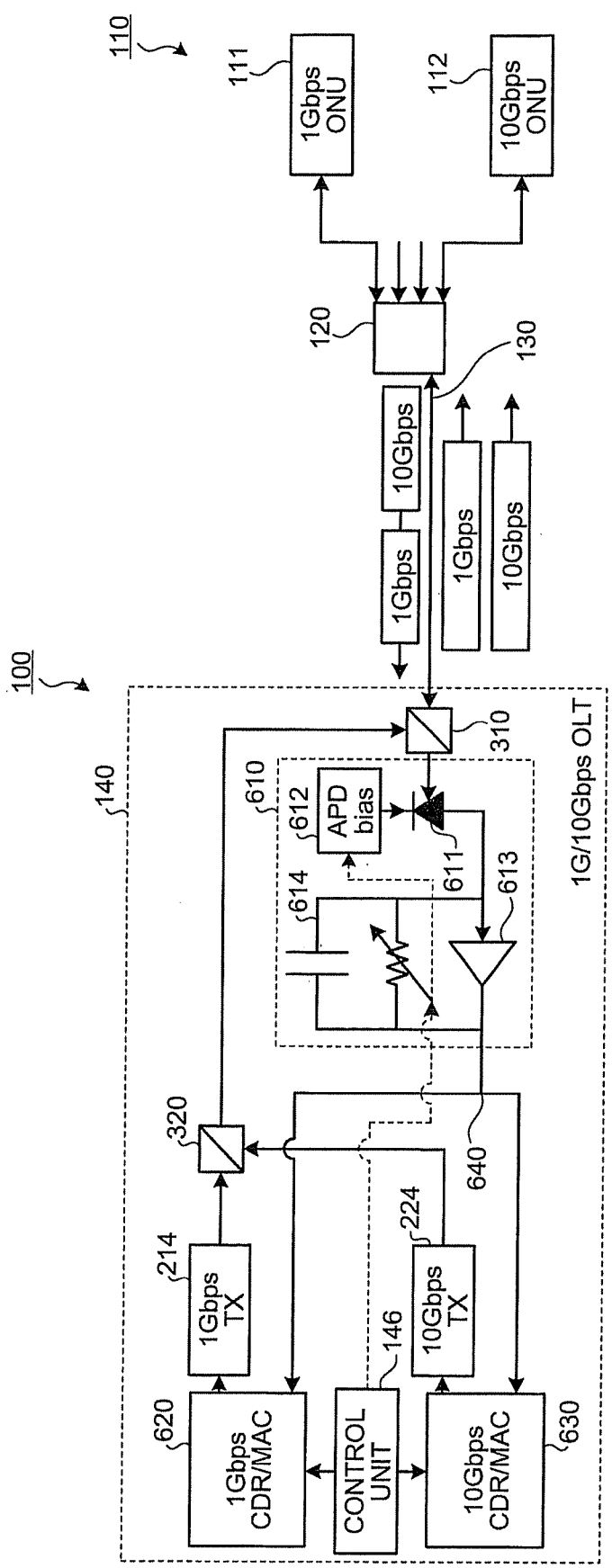
FIG. 8 is a block diagram for explaining a specific configuration of a communication system in which the optical line terminal according to the third embodiment is employed.
Figure 9:
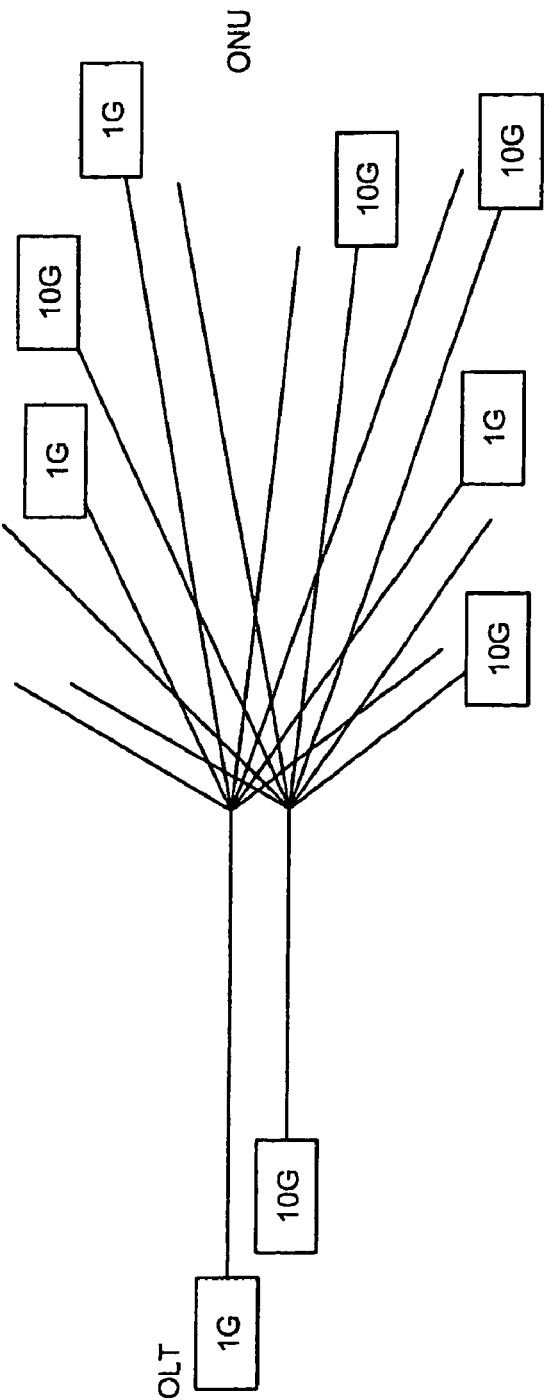
FIG. 9 is a diagram for explaining a configuration example of a communication system without a mixed 1-Gbps and 10-Gbps communication systems environment.
Figure 10:
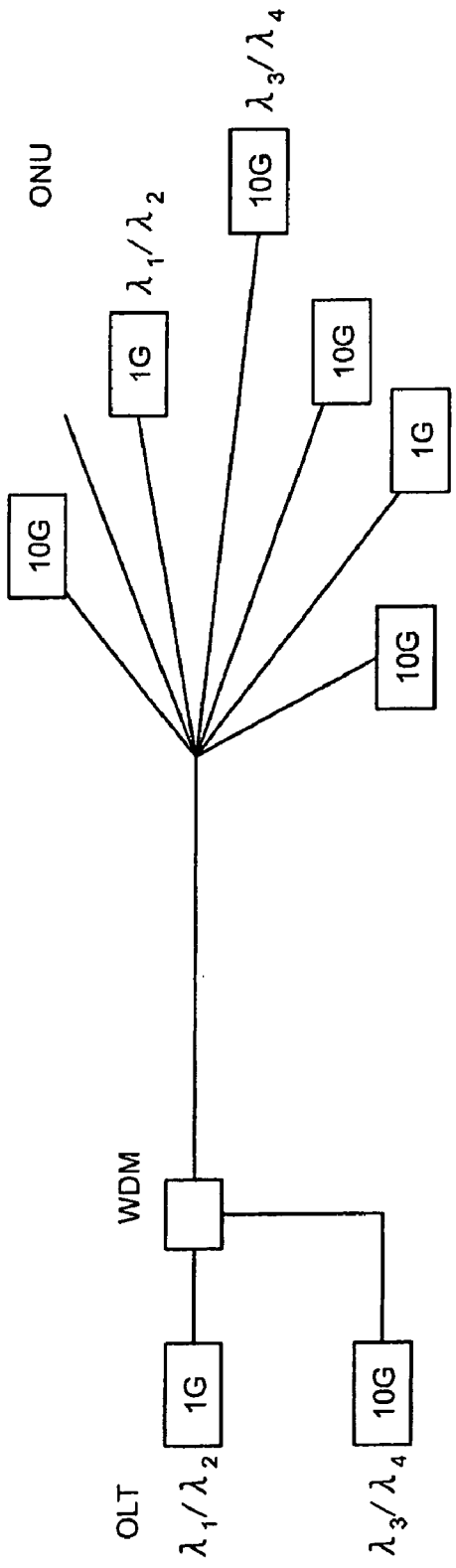
FIG. 10 is a diagram for explaining a first configuration example of a communication system having a mixed 1-Gbps and 10-Gbps communication systems environment.
Figure 11:
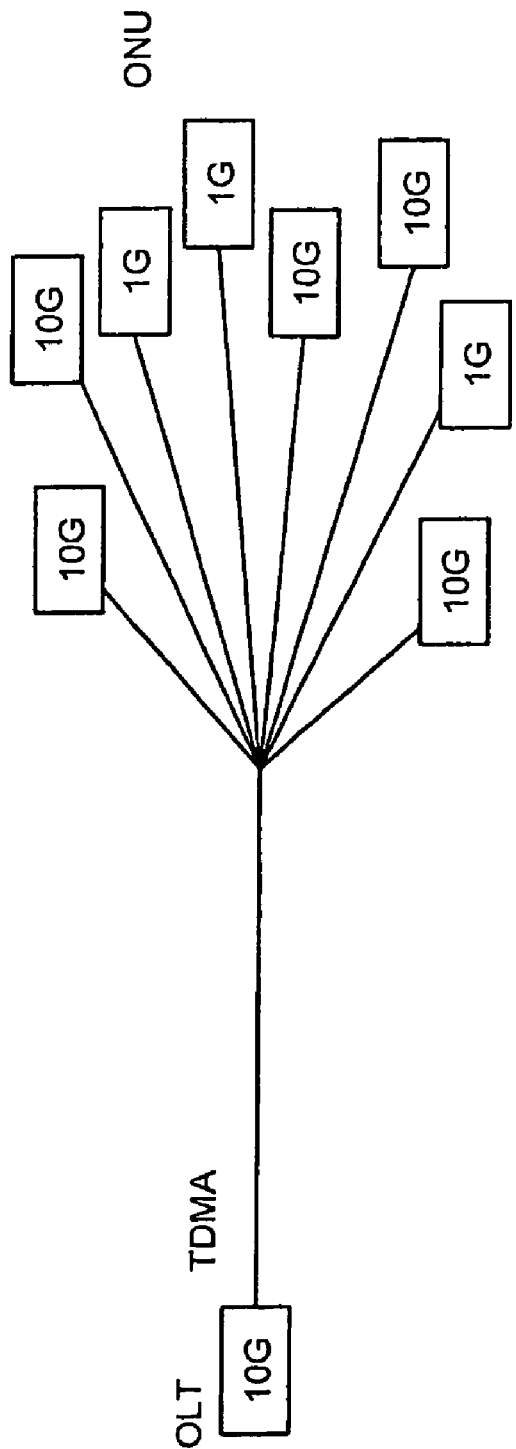
FIG. 11 is a diagram for explaining a second configuration example of a communication system having a mixed 1-Gbps and 10-Gbps communication systems environment.
Figure 12:
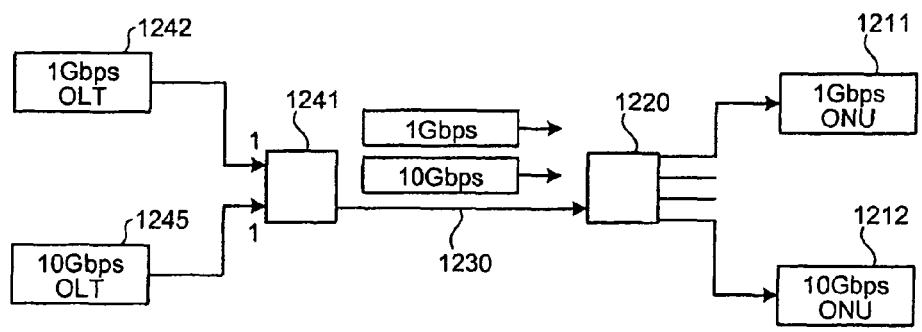
FIG. 12 is a diagram for explaining a third configuration example (downlinks) of a communication system having a mixed 1-Gbps and 10-Gbps communication systems environment.
Figure 13:
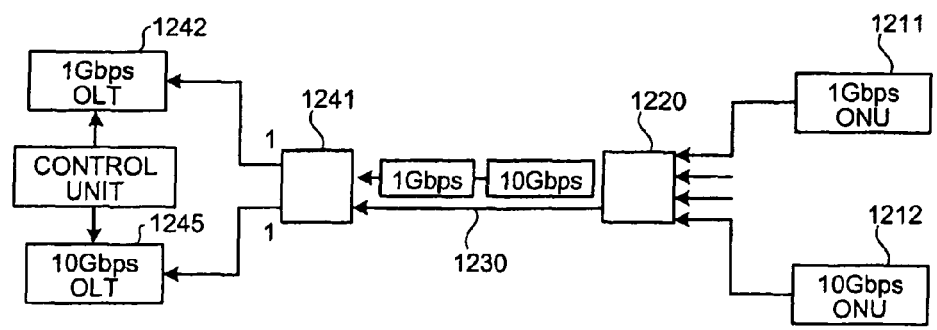
FIG. 13 is a diagram for explaining the third configuration example (uplinks) of a communication system having a mixed 1-Gbps and 10-Gbps communication systems environment.

FIG. 8 is a block diagram for explaining a specific configuration of a communication system in which the optical line terminal according to the third embodiment is employed. In FIG. 8, constituent elements identical to those in the communication system 100 depicted in FIGS. 3 and 6 are given the same reference numerals as those in the communication system 100 depicted in FIGS. 3 and 6, and explanation thereof will be omitted. As depicted in FIG. 8, the optical line terminal 140 includes the multiplexing and demultiplexing unit 310, the optoelectric converting unit 610, the low-speed communicating unit 620, the low-speed transmitter 214, the high-speed communicating unit 630, the high-speed transmitter 224, the multiplexing and demultiplexing unit 320, and the control unit 146.

The multiplexing and demultiplexing unit 310 outputs to the optoelectric converting unit 610, optical signals transmitted from the optical network units 110 via the branching unit 120 and the transmission line 130. The low-speed communicating unit 620 modulates transmitted data into a 1-Gbps electrical signal, and outputs the modulated electrical signal to the low-speed transmitter 214. The high-speed communicating unit 630 modulates transmitted data into a 10-Gbps electrical signal, and outputs the modulated electrical signal to the high-speed transmitter 224.

As described above, according to the optical line terminal 140 of the third embodiment, the optoelectric converting unit 610 converts a transmitted optical signal into an electrical signal, and then the branching unit 640 branches the electrical signal, thereby restraining intensity loss in the low-speed communication system associated with signal branching. Accordingly, even if a high-speed communication system is migrated to a cable plant of an existing low-speed communication system, the loss budget for the low-speed communication system can be maintained.

As explained above, according to the optical line terminal of the present embodiments, even if a communication system of a different bit rate is migrated to a cable plant of an existing communication system, the loss budget of the existing communication system can be maintained. Thus, a communication system of a different bit rate can be migrated without fundamental restructuring of the existing communication system.

In the foregoing embodiments, a 10-Gbps communication system is migrated to an existing 1-Gbps communication system; however, the present invention is not limited to this arrangement, and can be generally applied to cases where a communication system of a different bit rate is migrated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical line terminal that receives an optical signal transmitted by time division multiple access from a plurality of optical network units among which are an optical network unit performing communications at a first bit rate and an optical network unit performing communications at a second bit rate, the optical line terminal comprising:
    an optoelectric converting unit that converts the optical signal into an electrical signal;
    a branching unit that branches the electrical signal converted by the optoelectric converting unit, into two electrical signals;
    a first receiving unit that receives, among the electrical signals branched by the branching unit, an electrical signal having the first bit rate; and
    a second receiving unit that receives, among the electrical signals branched by the branching unit, an electrical signal having the second bit rate; and
    a control unit that acquires information concerning the time division multiple access and controls at least one of gain and bandwidth in the optoelectric converting unit, based on the information concerning the time division multiple access.

2. The optical line terminal according to claim 1, wherein the control unit, when an optical signal having a lower bit rate among the first bit rate and the second bit rate is received, controls the bandwidth in the optoelectric converting unit to become narrower than when an optical signal having a higher bit rate among the first bit rate and the second bit rate is received.

3. The optical line terminal according to claim 1, wherein the control unit, when an optical signal having a lower bit rate among the first bit rate and the second bit rate is received, controls the gain in the optoelectric converting unit to become larger than when an optical signal having a higher bit rate among the first bit rate and the second bit rate is received.

4. The optical line terminal according to claim 1, wherein the optoelectric converting unit comprises:
    an optoelectric converting element that converts the optical signal into an electrical signal, and
    an amplifier that amplifies the electrical signal optoelectrically converted by the optoelectric converting element.

5. The optical line terminal according to claim 4, wherein the control unit controls at least one of gain and bandwidth in the amplifier.

6. The optical line terminal according to claim 4, wherein the control unit controls at least one of gain and bandwidth in the optoelectric converting element.

7. An optical line terminal that receives an optical signal transmitted by time division multiple access from a plurality of optical network units among which are an optical network unit performing communications at a first bit rate and an optical network unit performing communications at a second bit rate, the optical line terminal comprising:
    an optoelectric converting unit that converts the optical signals into an electrical signal;
    a branching unit that branches the electrical signal converted by the optoelectric converting unit to an electrical signal having the first bit rate and an electrical signal having the second bit rate; and
    a control unit that acquires information concerning the time division multiple access and controls at least one of gain and bandwidth in the optoelectric converting unit, based on the information concerning the time division multiple access.

* * * * *

UNITED STATES PATENT AND TRADEMARK OFFICE
CERTIFICATE OF CORRECTION

PATENT NO.         : 8,238,753 B2                                   Page 1 of 1
APPLICATION NO.    : 12/414074
DATED              : August 7, 2012
INVENTOR(S)        : Hiroshi Hamano et al.

It is certified that error appears in the above-identified patent and that said Letters Patent is hereby corrected as shown below:

Column 10, Line 15, In Claim 1, delete "rate; and" and insert -- rate; --, therefor.

Signed and Sealed this
Sixth Day of November, 2012

David J. Kappos
*Director of the United States Patent and Trademark Office*